(12) United States Patent
Ayatsuka et al.

(10) Patent No.: US 7,228,108 B2
(45) Date of Patent: Jun. 5, 2007

(54) CONNECTION SYSTEM BETWEEN COMPUTER BODY AND WIRELESS PERIPHERAL EQUIPMENT, COMPUTER, AND WIRELESS PERIPHERAL EQUIPMENT

(75) Inventors: Yuji Ayatsuka, Tokyo (JP); Junichi Rekimoto, Tokyo (JP); Shigeru Tajima, Kanagawa (JP); Ivan Poupyrev, Tokyo (JP); Eduardo Agusto Sciammarella, Tokyo (JP); Henry Owen Newton-Dunn, Tokyo (JP); Nobuyuki Matsushita, Kanagawa (JP); Hiroaki Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 479 days.

(21) Appl. No.: 10/332,912

(22) PCT Filed: May 10, 2002

(86) PCT No.: PCT/JP02/04550

§ 371 (c)(1),
(2), (4) Date: Jun. 12, 2003

(87) PCT Pub. No.: WO02/093347

PCT Pub. Date: Nov. 21, 2002

(65) Prior Publication Data
US 2004/0015625 A1 Jan. 22, 2004

(30) Foreign Application Priority Data
May 15, 2001 (JP) .............................. 2001-144080

(51) Int. Cl.
*H04B 1/38* (2006.01)
(52) U.S. Cl. ...................... 455/73; 455/41.2; 455/41.1; 455/512; 455/66.1; 455/527; 710/8; 710/20; 710/40; 710/48; 710/64

(58) Field of Classification Search ............... 455/41.2, 455/66.1, 512, 41.1, 527, 73; 710/8, 20, 710/40, 48, 64
See application file for complete search history.

(56) References Cited

U.S. PATENT DOCUMENTS 4,870,799 A * 10/1989 Bergerioux et al. ............ 53/55

(Continued)

FOREIGN PATENT DOCUMENTS

EP        0 775 967        5/1997

(Continued)

*Primary Examiner*—Matthew Anderson
*Assistant Examiner*—Sujatha Sharma
(74) *Attorney, Agent, or Firm*—Finnegan, Henderson, Farabow, Garrett & Dunner, L.L.P.

(57) ABSTRACT

An RF tag 25 is incorporated in a mouse 20, and an RF tag reader 15 is mounted on the main body side of a computer 10. When using the mouse 20 to a specified computer 10, a user moves the mouse close to the reader 15 to read identification information (ID) of the mouse 20, which is included in the RF tag 25. On the main body side of the computer 10, the mouse 20 is designated in accordance with the read ID and communication with the mouse 20 is set.

There may be a case where a plurality of computers and peripheral equipment intermingle, but, by making joint use of the ID reader 15 in a short-range, a corresponding relationship between the main body of the computer 10 and the wireless equipment 20 is made clear.

12 Claims, 7 Drawing Sheets

U.S. PATENT DOCUMENTS

| | | | |
|---|---|---|---|
| 5,258,655 A * | 11/1993 | May et al. | |
| 5,765,036 A * | 6/1998 | Lim | |
| 5,881,366 A * | 3/1999 | Bodenmann et al. | |
| 6,359,610 B1 * | 3/2002 | Shah et al. | |
| 6,442,631 B1 * | 8/2002 | Neufeld et al. | |
| 6,445,379 B1 * | 9/2002 | Liu et al. | 345/163 |
| 6,529,119 B1 * | 3/2003 | Kumar et al. | |
| 6,806,866 B2 * | 10/2004 | Benayoun et al. | |
| 6,950,890 B2 * | 9/2005 | Liu et al. | |
| 6,952,497 B1 * | 10/2005 | Hollstrom et al. | 382/188 |
| 7,006,491 B2 * | 2/2006 | Saeed et al. | |
| 7,048,183 B2 * | 5/2006 | Coughlin et al. | 235/382 |
| 2002/0159419 A1 * | 10/2002 | Morris | |
| 2002/0159434 A1 * | 10/2002 | Gosior | |
| 2003/0132910 A1 * | 7/2003 | Garcia | |
| 2004/0076136 A1 * | 4/2004 | Beach | |

FOREIGN PATENT DOCUMENTS

| | | | |
|---|---|---|---|
| JP | 4-88420 | | 3/1992 |
| JP | 5-265625 | | 10/1993 |
| JP | 05272999 | * | 10/1993 |
| JP | 6-195163 | | 7/1994 |
| JP | 7-64718 | | 3/1995 |
| JP | 09034964 | * | 7/1995 |
| JP | 9-146693 | | 6/1997 |
| JP | 11-126134 | | 5/1999 |
| JP | 11-154056 | | 6/1999 |
| JP | 2000-82108 | | 3/2000 |
| JP | 2000-215000 | | 8/2000 |
| JP | 2000285525 | * | 10/2000 |

* cited by examiner

CONNECTION SYSTEM BETWEEN COMPUTER BODY AND WIRELESS PERIPHERAL EQUIPMENT, COMPUTER, AND WIRELESS PERIPHERAL EQUIPMENT

TECHNICAL FIELD

The present invention relates to a connection system between a computer body and peripheral equipment such as a mouse, a computer, and wireless peripheral equipment, and particularly to a wireless connection system between a computer body and peripheral equipment such as a mouse which are connectable via wireless communication, a computer, and wireless peripheral equipment.

To be more specific, the present invention relates to a wireless connection system between a computer body and peripheral equipment such as a mouse, a computer, and wireless peripheral equipment in a case where there are available a plurality of computers and peripheral equipment such as a mouse within a wireless communicable range; particularly to a wireless communication system assuring reliable and clear connection among the equipment, causing no interference of a computer body with a plurality pieces of peripheral equipment or no indistinctness of a corresponding relationship between the computer body and the peripheral equipment, a computer, and wireless peripheral equipment.

BACKGROUND ART

With recent technological innovation, a computer system of a general-purpose type commonly called a workstation or a personal computer (PC) which is relatively small and low-priced with high added value and highly sophisticated, has been developed and marketed, making its way deep into colleges, research organizations, corporations and other offices as well as daily life in an ordinary home.

A computer system is typically driven by responding to a user's input command and provides an "interactive" processing environment by displaying a processing result on the display screen. Recently, a shift has been noted from the character-based user input environment, that is, "CUI (Character User Interface)" via conventional keyboard as represented by a DOS (Disk Operating System) shell screen to "GUI (Graphical User Interface)" realizing graphical base user input. Under the GUI environment, there is available a desktop on which the computer system is simulated as well as an infinite number of icons on the display screen.

On the desktop provided with GUI, all the resource objects including applications and files to be handled on the computer system are expressed as icons. Handling a mouse and the like and directly impressing displayed objects on the screen with respect to the icons symbolizing programs, data, folders, devices and other items (for example, clicking and drag and drop operation), the user is able to operate the computer intuitively and directly. Also, on the desktop are available buttons such as menu bar and tool box for instantaneously calling various functions, that is, computer processing, hence, the computer input format is becoming more and more intuitive and easy to understand.

Generally, a user input unit such as a mouse and a keyboard has hitherto been connected to a computer body via cable. When a cable is used to connect between one apparatus and another, a corresponding relationship between a main body and peripheral equipment to be united thereby is visually clear. Yet, this often stands in the way of operating by the user. Especially, when it comes to a device such as a mouse which is required of the user to move back and forth frequently on a work surface (for example, on the desk), there is inconvenience as in a case of a cable getting twisted around the user's arm or mouse.

Accordingly, there has recently been introduced peripheral equipment such as a wireless mouse, one after another, which is connected to the computer body without cable. For instance, a computer body is connected to peripheral equipment without cable by using infrared data communication such as IrDA (Infrared Data Association) and short-range wireless data techniques such as Bluetooth.

Although this type of wireless device is convenient with no cumbersome cable, the corresponding relationship between the computer main body and the peripheral equipment tends to be indistinct. For example, when a plurality of personal computers (PCs) are in use nearby, the computer body cannot tell which peripheral equipment it is connected to, so that there is a possibility of interference between the equipment. Further, there is a possibility of causing confusion such as which PC a mouse in the user's hand is connected to or which mouse to use when desiring to input a command on a specific PC.

For example, by means of hardware-like switches, the setting of software and the like, there are employed techniques such as changing over a communication channel between a computer main body and a mouse, assigning identification information (ID) to the peripheral equipment side such as a mouse so as to register in the computer body an ID of the equipment being connected thereto by which circumstances of generating interference between the computer main body and the peripheral equipment can be avoided. Nonetheless, a setting operation of that kind conducted according to the manual is cumbersome for the user, and a wireless connection to improve operability eventually leads to reducing usability in the end.

Although the applicable range of wireless communication is some few meters, in the general office environment, there can occur easily and frequently circumstances in which a plurality of computers are provided in a communication range of that extent or a plurality of mice exist within a communication range of one computer.

Further, when the user is alone operating a plurality of computers, if a single mouse can be used for a plurality of computers by simply switching over connections, much gain in convenience will be obtained. Moreover, the number of mice to be used can be saved, thus leading to cost curtailment and space savings.

DISCLOSURE OF INVENTION

It is an object of the present invention to provide an excellent wireless connection system between a computer main body and peripheral equipment such as a mouse, a computer, and wireless peripheral equipment, which are connectable via wireless communication.

It is another object of the present invention to provide an excellent wireless connection system between a computer main body and peripheral equipment such as a mouse, a computer, and wireless peripheral equipment, which are applicable when there are a plurality of computers and peripheral equipment such as a mouse within a wireless communicable range.

It is a further object of the present invention to provide an excellent wireless connection system, a computer, and wireless peripheral equipment which assure a reliable and clear connection between a computer and equipment, in which a computer main body suffers no interference with a plurality pieces of peripheral equipment or a user has no indistinct corresponding relationship between the computer body and peripheral equipment.

The present invention has been accomplished by taking the above-mentioned problems into consideration, and a first aspect thereof is a connection system to establish communication between a computer main body and wireless peripheral equipment which are connectable via wireless communication, characterized by comprising: characteristic identification information held on the side of the above-mentioned wireless peripheral equipment; an ID reader for reading the above-mentioned identification information, which is mounted on the above-mentioned computer main body side; and connection setting means to establish a wireless data transfer channel between the above-mentioned computer main body and said wireless peripheral equipment by specifying the above-mentioned wireless peripheral equipment in accordance with the identification information read by the above-mentioned ID reader.

Now, it is preferable for the above-mentioned ID reader, after setting a connection, to read identification information from the above-mentioned wireless peripheral equipment by dint of communication means different from the wireless data transfer channel between the computer main body and the above-mentioned wireless peripheral equipment.

The above-mentioned ID reader can read the characteristic identification information held by the above-mentioned wireless peripheral equipment side by means of an electromagnetic interfacing method, for example.

In such a case, an RF tag is built in the wireless peripheral equipment such as a mouse, while an RF tag reader is installed on the computer body side. The user, when using the mouse for a specific computer, can make a connection request to the peripheral equipment by moving the mouse close to the reader. Then, identification information (ID) of the mouse, which is embedded in the RF tag is read. On the computer main body side, it is possible to specify the mouse in accordance with the read ID and to establish communication.

Namely, while there may be a plurality of computers and peripheral equipment within a wireless communicable range, in accordance with the wireless connection system associated with the first aspect of the present invention, combined use of an ID reader over a short-range identifiable by means of the electromagnetic interfacing method makes it possible to make clear a corresponding relationship between the computer main body and the wireless equipment.

Naturally, the identification information may be read from the wireless peripheral equipment by means other than the RF tag. For example, the above-mentioned wireless peripheral equipment may be arranged to hold visible identification information in a manner of pasting it on the surface of the outer casing, then the above-mentioned ID reader may recognize a pickup image of such visible ID and specify the ID of the wireless peripheral equipment.

Or, the above-mentioned ID reader may be arranged to access and read the wireless peripheral equipment via wireless data communication such as infrared data communication or short-range wireless data communication.

Additionally, the above-mentioned connection setting means may be arranged to permit simultaneous connection of a plurality pieces of wireless peripheral equipment. For example, there may be an arrangement by which connection of a plurality of wireless mice is permitted.

Or, the above-mentioned connection setting means, in response to an occurrence of a new connection request to other wireless peripheral equipment while a connection is being set to wireless peripheral equipment, may set a connection newly to such other wireless peripheral equipment and, at the same time, release the connection to the original wireless peripheral equipment. Also, conversely, in a case of the occurrence of a new connection request to other wireless peripheral equipment while a connection is being set to wireless equipment, the connection request to such other wireless peripheral equipment may be rejected by giving priority to the existing corresponding relationship.

Moreover, a second aspect of the present invention is a computer connectable to one or more peripheral equipment via wireless communication, characterized by comprising: an ID reader for reading characteristic identification information held on the above-mentioned wireless peripheral equipment side; and connection setting means for setting a wireless data transfer channel between such wireless peripheral equipment by specifying the above-mentioned wireless peripheral equipment in accordance with the identification information read by the above-mentioned ID reader.

Now, it is preferable for the above-mentioned ID reader, after setting a connection, to read an ID from such wireless peripheral equipment by means other than the wireless data transfer channel with the wireless peripheral equipment.

The above-mentioned ID reader may be arranged to read characteristic identification information held on the wireless peripheral equipment side according to the electromagnetic interfacing method, for example.

In such a case, an RF tag is built in the wireless peripheral equipment such as a mouse, and an RF tag reader is installed on the computer side. The user, when using the mouse for a specific computer, can make a connection request to the peripheral equipment by moving the mouse close to the reader, and identification information (ID) of the mouse embedded in the RF tag is caused to be read. In accordance with the read ID, the computer is able to specify the mouse and thus to establish communication.

Namely, although there may be an intermingling with a plurality of computers and peripheral equipment within a wireless communicable range, according to the present invention, combined use of the ID reader over a short-range identifiable by the electromagnetic interfacing method enables the computers to make clear corresponding relationships with wireless equipment.

Naturally, there may be arranged a different way of reading identification information from the wireless peripheral equipment by means other than the RF tag. For example, the above-mentioned wireless peripheral equipment holds visible identification information in a manner of pasting it on the surface of the exterior frame. On the other hand, on the computer side, the above-mentioned identification information reader may be adapted to recognize a pick up image of such visible identification information, thereby making it possible to specify the identification information of the above-mentioned wireless peripheral equipment.

Or, the above-mentioned ID reader may be arranged to access the above-mentioned wireless peripheral equipment by means of wireless data communication such as infrared data communication or short-range wireless data communication and read the identification information.

Further, the above-mentioned connection setting means may be arranged to permit simultaneous connection of a plurality of wireless peripheral equipment.

Alternatively, the above-mentioned connection setting means, in response to the occurrence of a connection request to other wireless peripheral equipment while a connection to wireless peripheral equipment is being set, may be arranged to establish a new connection to the other wireless peripheral equipment and, at the same time, a connection to the original wireless peripheral equipment may be released. Also, conversely, in the case of the occurrence of a connection request to other wireless peripheral equipment while a connection is being set with wireless peripheral equipment, it may be arranged that the connection request to the other wireless peripheral equipment be rejected, giving priority to the hitherto-maintained corresponding relationship.

Furthermore, a third aspect of the present invention is wireless peripheral equipment connectable to a computer main body via wireless communication and characterized by wirelessly and readably holding characteristic identification information to be used by the above-mentioned computer main body to specify the equipment.

It is preferable for the above-mentioned identification information to be readable by means other than the wireless data transfer channel with the above-mentioned computer main body after setting the connection.

Wireless peripheral equipment may be arranged to hold the above-mentioned identification information in a readable manner through the electromagnetic interfacing method, for example.

In such a case, wireless peripheral equipment such as a mouse can hold identification information of its own in the form of an RF tag. And, an RF tag reader is installed on the computer side. The user, when using wireless peripheral equipment with respect to a specific computer main body, is able to make a connection request to the computer main body by moving the wireless peripheral equipment on the computer body side close to the reader, and cause the computer body side to read the identification information (ID) of the wireless peripheral equipment which is embedded in the RF tag. The computer can establish communication by specifying the wireless peripheral equipment in accordance with the read ID.

Namely, although there may be an intermingling with a plurality of computers and peripheral equipment within a wireless communicable range, according to the present invention, combined use of an ID reader over a short-range identifiable by an electromagnetic interfacing method enables the computers to make clear corresponding relationships with wireless equipment.

Naturally, the wireless peripheral equipment may be arranged to hold identification information of its own in a readable format by means other than the RF tag. For example, the above-mentioned wireless peripheral equipment mentioned above may hold visible identification the outer casing. In such a case, on the computer side, the above-mentioned ID reader may be arranged to recognize a pick up image of such visible identification information, thereby making it possible to specify the identification information of the above-mentioned wireless peripheral equipment.

Or, the wireless peripheral equipment may be adapted to output externally its own identification information by means of infrared data communication or short-range wireless data communication.

Further and other objects, features, and advantages of the present invention will become apparent in the more detailed description based on the working examples of the invention to be made later and accompanying drawings.

BEST MODE FOR CARRYING OUT THE INVENTION

Embodiments of the present invention will be described in detail below with reference to the drawings.

Figure 1:
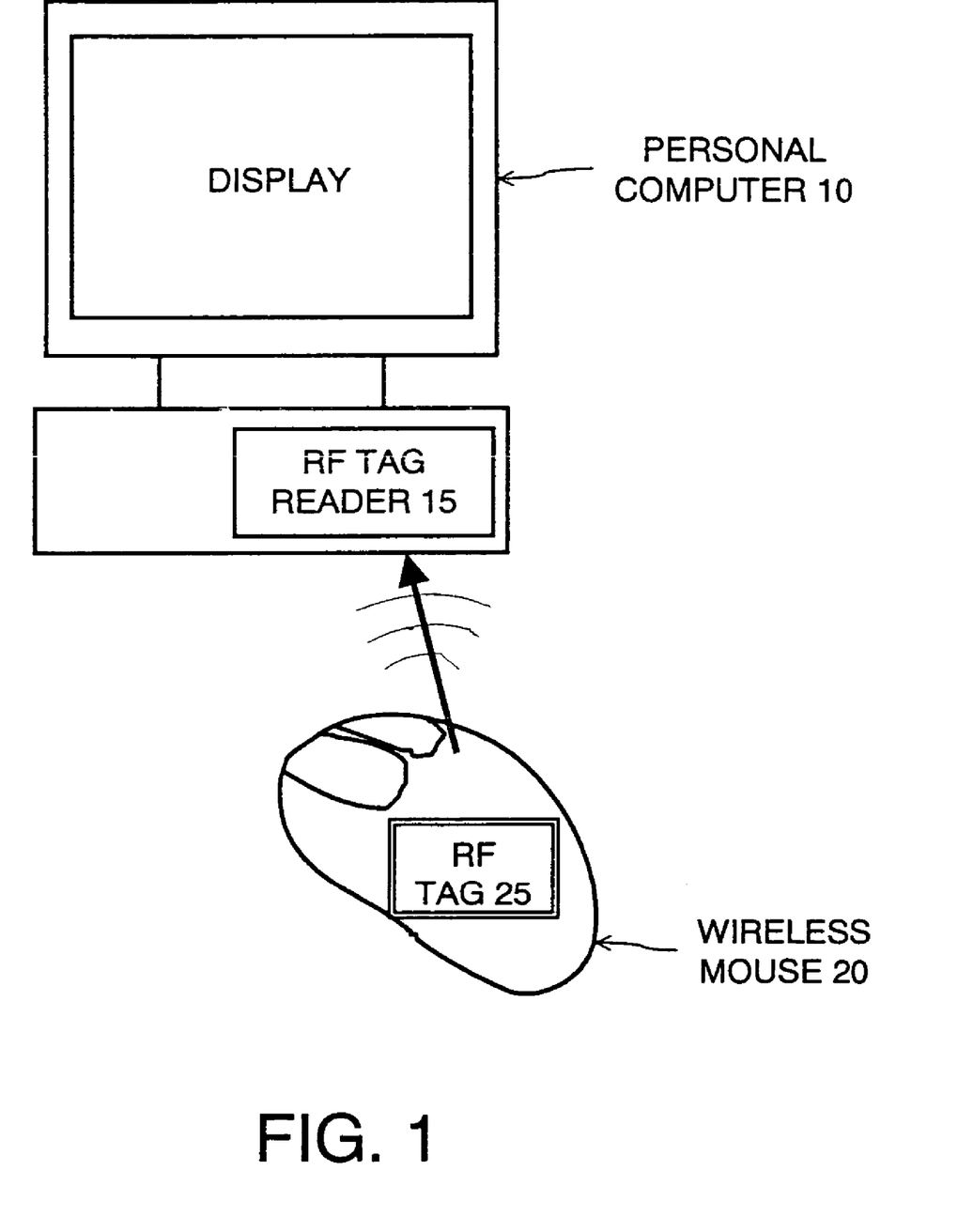
FIG. 1 is a diagram showing an external configuration of a personal computer 10 and a wireless mouse 20 which realize the present invention.

FIG. 1 shows an external configuration of a personal computer 10 and a wireless mouse 20 which realize the present invention.

The personal computer 10 comprises a main body having incorporating therein a system board mounted with a main circuit chip such as a CPU (Central Processing Unit) and a memory, and main peripheral equipment (both not illustrated) such as a hard disk drive, and a display and other items connected thereto. The main body of the computer 10 can, for example, be formed of an IBM PC/AT (Personal Computer/Advanced Technology) compatible or its upgrade.

Also, normal communication involving coordinate instruction data between the main body of the computer 10 and the wireless mouse 20, for example, is realized by using wireless communication media such as infrared data communication in terms of IrDA and short-range wireless data communication in terms of Bluetooth. However, a coordinate instruction data transmission system itself has no direct bearing on the essential points of the present invention, hence, no further description will be given in the present specification.

As the same drawing indicates, a wireless tag such as an RF tag is built in the wireless mouse 20, while an RF tag reader 15 is installed on the computer body 10 for reading information stored in the RF tag. More preferably, the RF tag reader 15 is installed at a place such as a display where the user can visually see with ease.

In the RF tag on the wireless mouse 20 side, there is stored an RF-ID as identification information specifiable by the mouse 20 itself. If the user desires to use the wireless mouse 20 on the specified personal computer 10, the user holds up the wireless mouse 20 over the RF tag reader 15 of the main body of the computer 10. In response to this, on the basis of the read RF-ID, the personal computer 10 side specifies that the other party is the wireless mouse 20, thereby setting a connection to the mouse 20.

Namely, on the main body side of the computer 10, on the basis of the RF-ID held by the wireless mouse 20, a corresponding relationship between one equipment and another is set to avoid interference with other equipment than that. Also, as far as the user is concerned, since the user carries out connection by an intentional act of holding up the wireless mouse 20 over the computer 10, the user can recognize the corresponding relationship between one equipment and another.

In today's office environment, there may be an intermingling of a plurality of computers and peripheral equipment within a wireless communicable range. In the present embodiment, combined use of an ID reader over a short-range makes it possible to make clear the corresponding relationship between the main body of the computer 10 and the wireless mouse 20.

Figure 2:
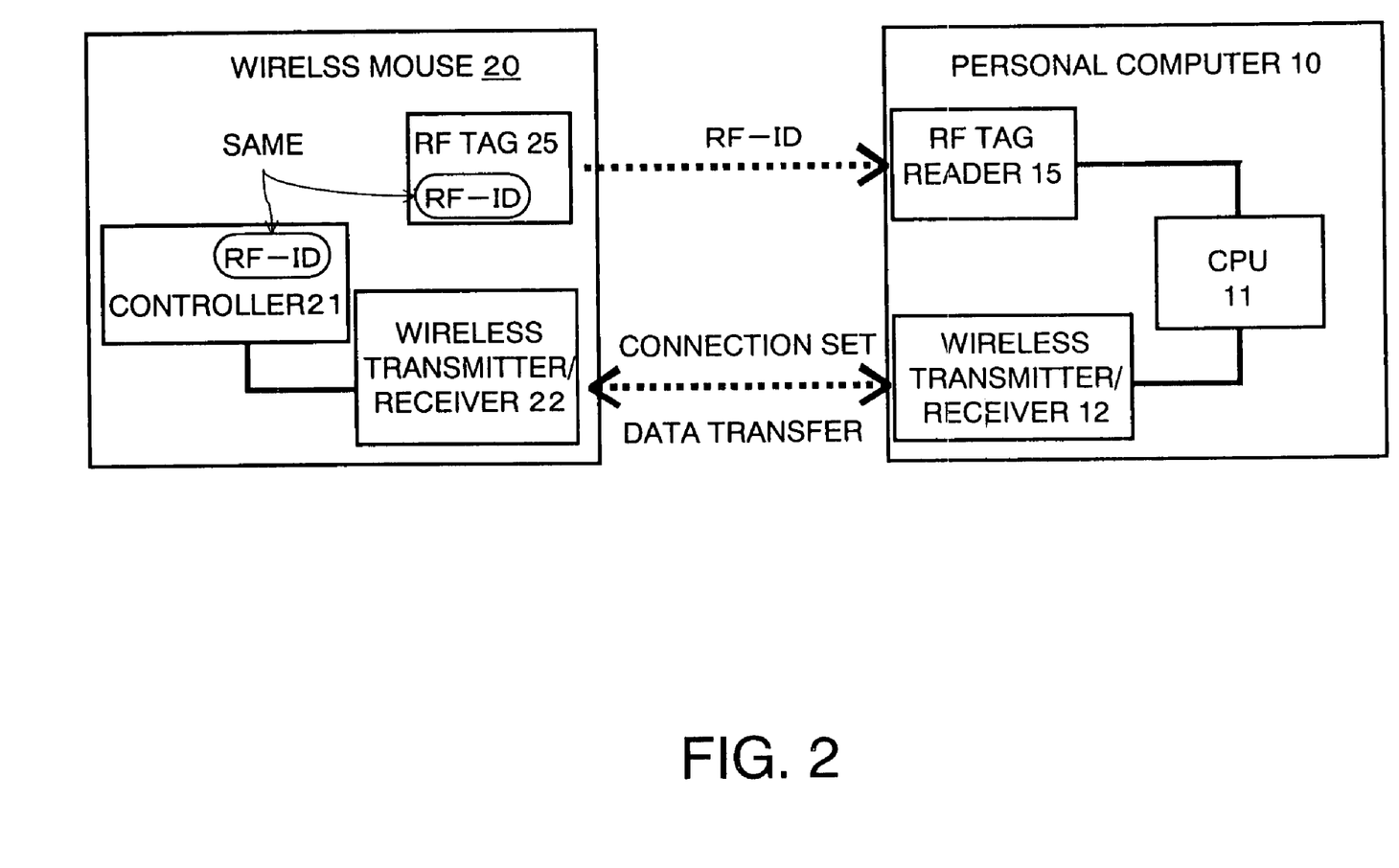
FIG. 2 is a schematic block diagram explaining a setup by which to carry out a wireless connection between the computer body 10 and the wireless mouse 20.

FIG. 2 shows a functional module for carrying out a wireless connection between the main body of the computer 10 and the wireless mouse 20.

The personal computer 10 comprises a CPU 11 executing various program codes to assume general control of the system, a wireless mouse 20 for transferring coordinate instruction data and the like, a wireless transmitter/receiver 12 to provide wireless connection to the wireless mouse 20, and an RF tag reader 15 for reading information stored in the RF tag from wireless equipment such as the mouse 20.

Further, the wireless mouse 20 comprises a controller 21 to control basic operation such as inputting and outputting coordinate instruction data therein, a wireless transmitter/receiver 22 to provide wireless connection to the personal computer 10 for transfer of coordinate instruction data and the like, and the RF tag 25 in which the RF-ID as the identification information that can specify the mouse 20 itself is stored.

The user, when desiring to use the wireless mouse 20 on the specified personal computer 10, holds up the wireless mouse 20 over the RF tag reader 15 of the main body of the computer 10. In response to this, on the personal computer 10 side, the RF-ID held in the wireless mouse 20 is read by the RF tag reader 15.

The CPU 11, in accordance with the read RF-ID, performs recognition processing of the wirelessly connected peripheral equipment. Namely, upon recognizing that the other party is the wireless mouse 20, a device driver for operating the wireless mouse is activated, a preset negotiation is carried out to connect to the wireless mouse 20 via wireless transmitters/receivers 12 and 22, and the connection is established.

Figure 3:
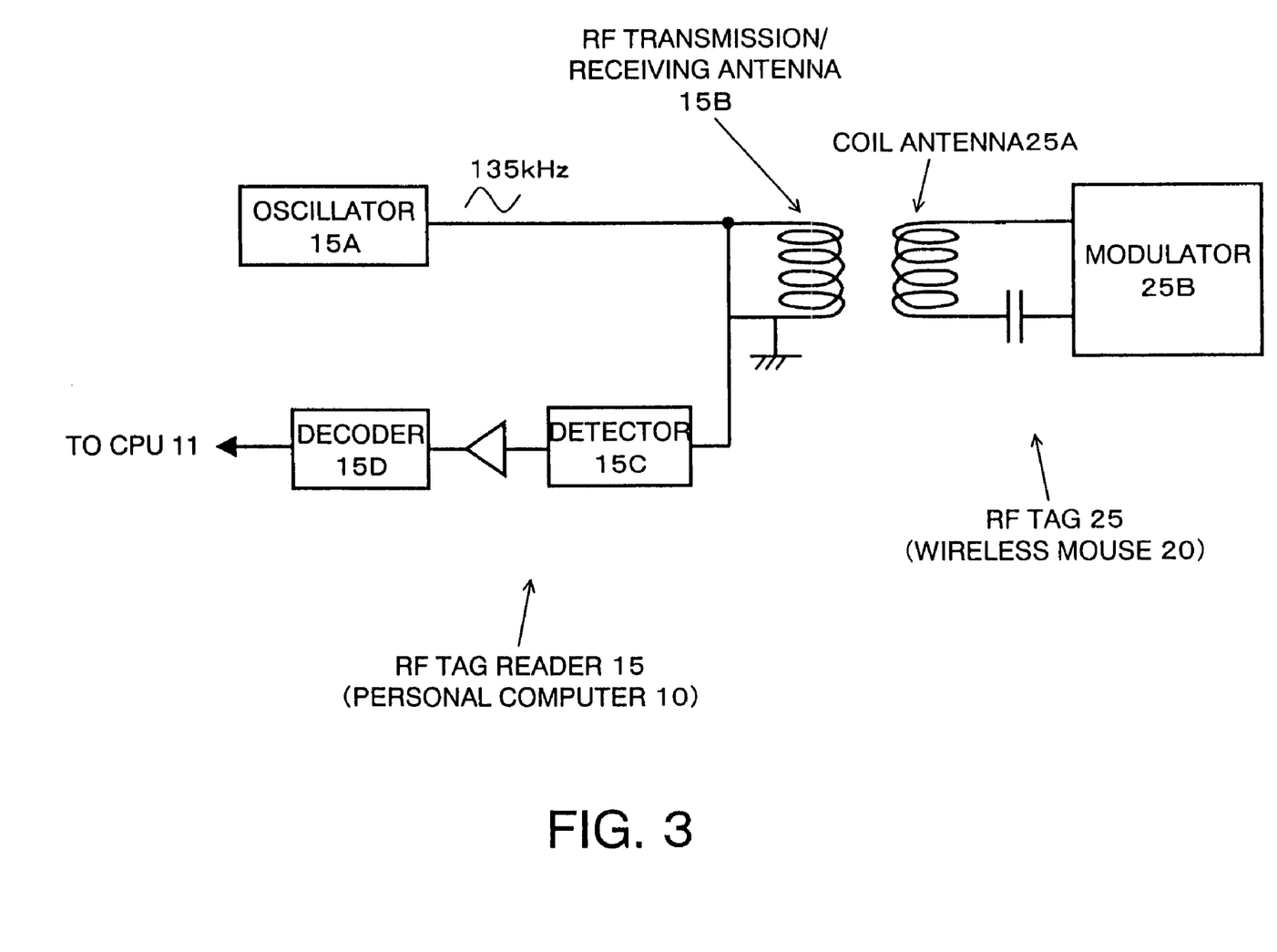
FIG. 3 is a functional block diagram explaining an operation to read an RF-ID from an RF tag 25 built in the wireless mouse 20.

FIG. 3 shows a functional block diagram to explain an operation to read the RF-ID from the RF tag 25 built in the wireless mouse 20. For the illustrated example, an electromagnetic interfacing method is employed for wireless transmission and reception.

The RF tag reader 15 on the personal computer 10 side comprises an oscillator 15A, an RF transmission/receiving antenna 15B, a detector 15C, and a decoder 15D. In this RF tag reader 15, a radio wave of a specified frequency (135 kHz in the illustrated example) oscillated by the oscillator 15A is amplified to be externally outputted via the RF transmission/receiving antenna 15B.

On the other hand, the RF tag 25 is made up of a coil antenna 25A and a modulator 25B. As a result of the user's action of holding up the wireless mouse 20 over the RF tag reader 15, the RF tag 53 moves close to the RF transmission/receiving antenna 15B to be able to receive an electromagnetic wave. And the coil antenna 25A resonates with the received electromagnetic wave by which resonance energy is stored.

The modulator 25B is driven by electric energy obtained by converting the accumulated resonance, and executes modulation processing of the received electromagnetic wave, and generates a modulated frequency equivalent to an ID assigned to the wireless mouse 20 to be outputted via the coil antenna 25A.

The RF transmission/receiving antenna 15B receives an electromagnetic wave having the modulated frequency from the RF tag 25. Then, the decoder 15D decodes the identification information (RF-ID) assigned to this modulated frequency and transfers the identification result to the CPU 11.

If the user desires to connect the same wireless mouse 20 to other personal computer 10' and use it, this wireless mouse is brought close to the RF tag reader of the new personal computer 10' and held up over it. In the same way as the above-mentioned case, this enables the wireless mouse to correspond to the new personal computer 10'. However, the corresponding relation-ship with the original personal computer 10 must be released (refer to FIG. 4).

Figure 4:
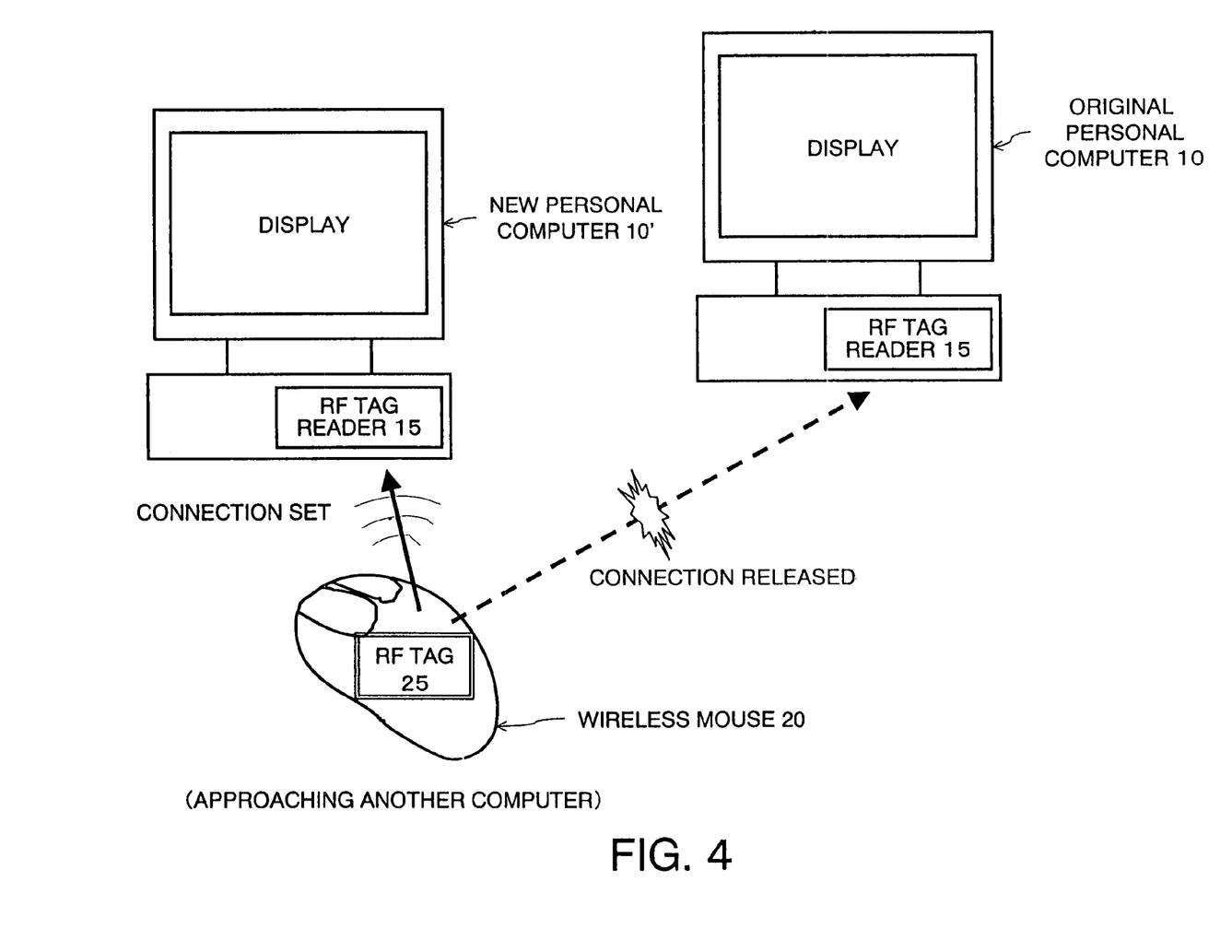
FIG. 4 is a diagram showing how the same wireless mouse 20 is connected to other personal computer 10 and how its corresponding relationship with the original personal computer 10 is released.

To start a connection or a new connection between the wireless equipment as mentioned above, the wireless mouse 20 as the peripheral equipment may be arranged to send a release instruction signal to the original personal computer 10. Or, in a case where the personal computers 10 and 10' are mutually connected to a network such as LAN (Local Area Network), a connection release may be carried out via communication between the computers.

In the former case, there may be a case where, when the wireless mouse 20 is newly connected to the next computer 10', the original computer 10 may possibly be already out of the wireless communicable range. Accordingly, on the main body side of the computer 10, there may be installed a mechanism by which the connection to the wireless peripheral equipment is automatically released when communication from the last access pauses (i.e., time-out) for a preset period of time. Of course, a mechanism with which the user manually releases the wireless connection using a consol may be employed.

Or in the latter case, the computer 10' which sets a new connection to the wireless mouse 20 may be adapted to send a message to that effect to the original computer 10. On the original computer 10 side, in response to receiving a message notifying the setting of the next connection, it may be arranged to release its connection to the wireless mouse 20. In a case where the new computer 10' is not aware of the address of the original computer 10, for example, the message may be arranged to be transmitted in a broadcast form.

Figure 5:
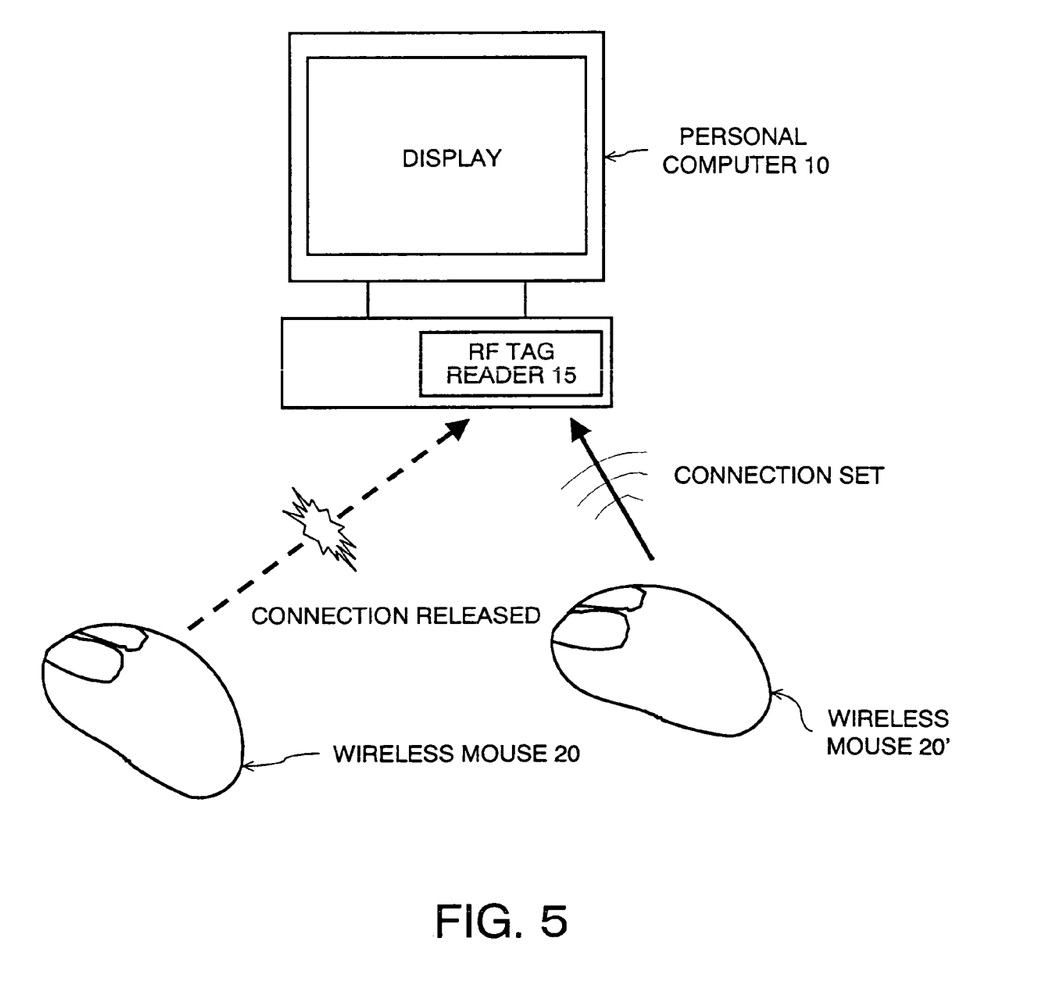
FIG. 5 is a diagram showing how the personal computer 10 releases its connection to the original wireless mouse 20 when other wireless mouse 20' is moved close to the personal computer 10 correspondence of which is already established to its connection relationship with the wireless mouse 20.
Figure 6:
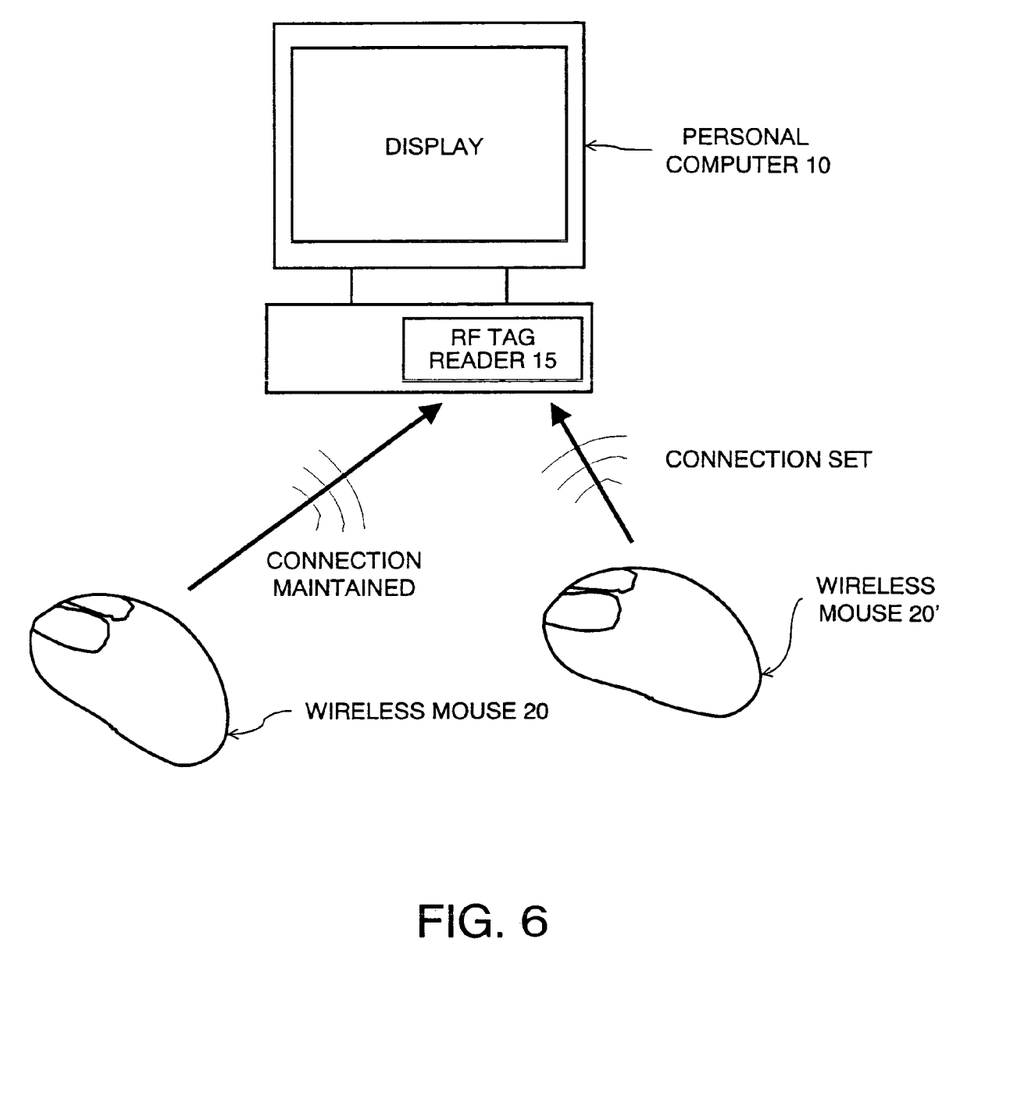
FIG. 6 is a diagram showing how the personal computer 10 establishes correspondence with both wireless mice 20 and 20' when the other wireless mouse 20' is moved close to the personal computer 10 correspondence of which is already established with its connection relationship with the wireless mouse 20.

Further, when other wireless mouse 20' is brought closer to the personal computer 10 corresponding connection relationship of which is already set with the wireless mouse 20, the personal computer 10 may be arranged to release its connection to the original wireless mouse 20 (refer to FIG. 5). Or, there may be another method by which the personal computer 10 is arranged to correspond to both wireless mice 20 and 20' so that communication of coordinate instruction data and the like may be carried out from both (refer to FIG. 6).

Figure 7:
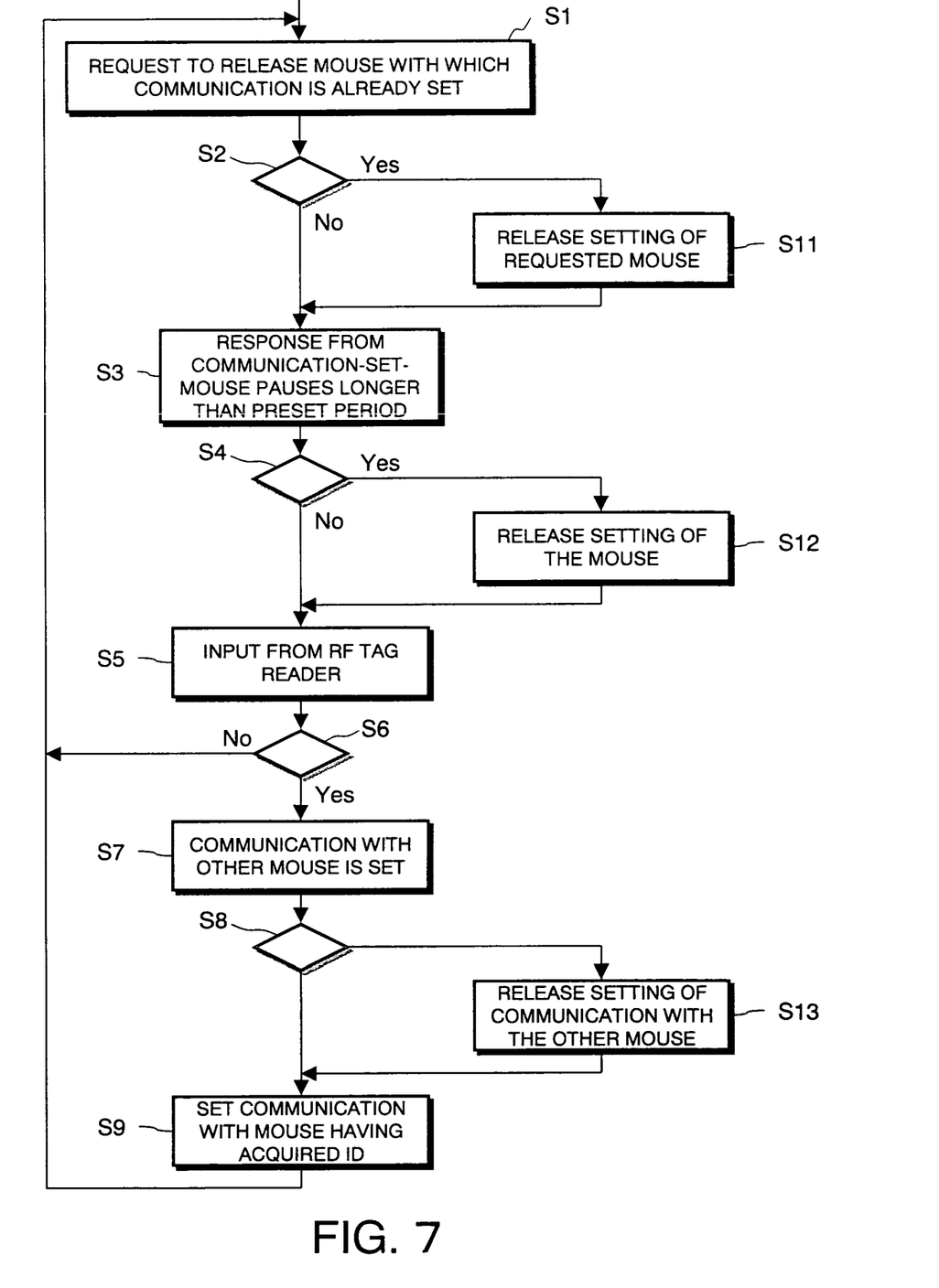
FIG. 7 is a flow chart showing an operating procedure for internal processing in the personal computer 10 which carries out a wireless connection to peripheral equipment.

FIG. 7 shows a flow chart of an operating procedure for internal processing in the personal computer 10 carrying out a wireless connection to the peripheral equipment in the manner mentioned above. This operating procedure, for example, is realized by way of the CPU 11 executing a preset control program. Internal processing in the personal computer 10 carrying out a wireless connection to the peripheral equipment will be described below with reference to the flow chart.

First, it is checked as to whether or not there is a request to release connection to a wireless mouse with which communication has already been set (step S1). The request to release connection to the mouse occurs, for example, when it is received by way of console inputting by the user or a time-out (a lapse of preset time from the last communication with the mouse).

When the connection release request occurs from the mouse, the processing proceeds from decision block S2 to branch Yes and the setting with respect to the mouse from which the connection release request was made is released (step S11).

Next, it is checked as to whether or not a response from the mouse with which communication is set pauses longer than the preset period of time, that is, whether or not a time-out occurred (step S3).

In a case of a time-out, the process proceeds to branch Yes of decision block S4 and the setting of the applicable mouse is released (step S12). For example, if there is a limit to the number of wireless connection ports on the main body side of the computer 10, releasing the connection to the wireless peripheral equipment in sequence by means of time-out is conducive to saving the number of ports, that is, computer resources.

However, the connection release processing of the wireless peripheral equipment by means of time-out can be omitted.

Next, it is checked as to whether or not an input from the RF tag reader 15, that is, a connection request from a new wireless mouse has occurred (step S5).

In a case of no new connection request, the process returns from branch No of decision block S6 to step S1, and the same processing operation as mentioned above is repeatedly executed.

On the other hand, in a case of the occurrence of a new connection request, it is further checked as to whether or not communication with other wireless mouse has already been set (step S7).

In a case where a connection to other wireless mouse has already been set, the process proceeds to branch Yes of decision block S8 and releases the setting of communication with the other wireless mouse (step S13).

In step S9, there is set communication with a wireless mouse specified by an RF-ID newly acquired by the RF tag reader 15. When newly setting communication, to establish correspondence, negotiation following a preset protocol may be arranged between the main body 10 of the computer 10 and the wireless mouse 20.

And the process returns to step S1 and the same processing operation as mentioned above is repeatedly executed.

However, communication release processing with other wireless mouse in response to the appearance of a new wireless mouse may be omitted. For example, as mentioned above, one computer having simultaneous connection or corresponding relationship with two or more wireless mice can be permitted. Or even if a new wireless mouse penetrates the communicable range, it may be so arranged that priority be given to the connection to the original wireless mouse.

Further, there may be cited several similar methods capable of providing the same technical function as the present embodiments mentioned above.

For example, it may be so arranged that the RF tag is held in the main body side of the computer, and that the RF reader is mounted on the wireless peripheral equipment side such as a mouse.

Of course, the computer main body and the wireless peripheral equipment may be arranged to give and receive identification information by using identifying means other than the RF tag. For example, identifiable, visible identification information based on visible information such as a bar code and a cyber code* is pasted to the wireless peripheral equipment (or a computer main body) so that the other computer main body (or the wireless peripheral equipment) may read the identification information in accordance with a pickup image by a camera and the like. Or infrared data communication such as IrDA and short-range wireless data communication such as Bluetooth may be used to give and receive identification information.

<Note>
* Cyber code is a kind of two-dimensional bar code, comprising a "guide bar display region" to indicate the address of the cyber code and a "code pattern display region" to indicate a two-dimensional shape code pattern. In the code pattern display region, there constitutes an array of cells in an n×m matrix, and each cell may be provided with an ID by expressing it in two values of white or black. For example, the cyber code is disclosed in Japanese Patent Application Publication 2000-82108 ("Two-dimensional code recognition processing apparatus, and media") which has already been assigned to the present applicant.

SUPPLEMENT

As mentioned above, the present invention has been described in detail with reference to specific working examples. However, it is self-evident that modifications and substitutions of the embodiments may be made by those skilled in the art without departing from the essential points of the present invention.

Although in the present specification, a mouse is taken for consideration and described as an example of peripheral equipment wirelessly connecting to a computer body, the essential points of the present invention are not limited thereto. For example, in a case of wirelessly connecting other user-input apparatus such as a keyboard or peripheral equipment such as a printer, which is other than a user-input apparatus, to a computer body, likewise, the present invention may be applied to establish correspondence between one wireless equipment and another.

In summary, the present invention has been disclosed by way of illustration and should not be construed in a limited sense. To judge the essential points of the present invention, the column of the scope of claims set forth at the beginning should be taken into consideration.

INDUSTRIAL APPLICABILITY

According to the present invention, it is possible to provide an excellent wireless connection system between a computer body and peripheral equipment such as a mouse which are connectable via wireless communication, a computer, and wireless peripheral equipment.

Also, according to the present invention, it is possible to provide an excellent wireless connection system between a computer body and peripheral equipment such as a mouse, a computer, and wireless peripheral equipment, which are applicable to the case where there are a plurality of computers and peripheral equipment such as a mouse within a wireless communicable range.

Further, according to the present invention, it is possible to provide an excellent wireless communication system which assures reliable and clear connection between one equipment and another, a computer, and wireless peripheral equipment, which have no interference of a computer body with a plurality of peripheral equipment or no indistinctness of a corresponding relationship between the computer body and the peripheral equipment.

Above all, the present invention operates advantageously when small peripheral equipment such as a mouse is shared by a plurality of computers accompanying movement of the user.

What is claimed is:

1. A connection system for setting communication between a first computer and wireless peripheral equipment which are connectable by wireless communication, said system comprising:
    characteristic identification information held in said wireless peripheral equipment side;
    an ID reader for reading said identification information, the ID reader being on said first computer side; and
    connection setting means for setting a wireless data transfer channel between said first computer and said wireless peripheral equipment by specifying said wireless peripheral equipment in accordance with identification information read by said ID reader, wherein said connection setting means, in response to an occurrence of a connection request to a second computer while a connection is being set to the wireless peripheral equipment, sets a new connection to said second computer, and releases the connection to the wireless peripheral equipment by sending information from said second computer to said first computer via communication between said first computer and said second computer.

2. The connection system between a first computer and wireless peripheral equipment according to claim 1, wherein:
    said ID reader reads the identification information from said wireless peripheral equipment, after setting a connection, by means other than the wireless data transfer channel between said first computer and said wireless peripheral equipment.

3. The connection system between a first computer and wireless peripheral equipment according to claim 1, wherein:
    said ID reader reads characteristic identification information held in said wireless peripheral equipment side by means of an electromagnetic interfacing method.

4. The connection system between a first computer and wireless peripheral equipment according to claim 3, wherein:
    a connection request is made to said first computer by placing said wireless peripheral equipment within a communicable range of said ID reader in accordance with said electromagnetic interfacing method.

5. The connection system between a first computer and wireless peripheral equipment according to claim 1, wherein:
    said wireless peripheral equipment holds visible identification information; and
    said ID reader recognizes a pickup image of said visible identification information and specifies the identification information of said wireless peripheral equipment.

6. The connection system between a first computer and wireless peripheral equipment according to claim 1, wherein:
    said ID reader accesses said wireless peripheral equipment by means of infrared data communication or short-range wireless data communication and reads the identification information.

7. A first computer connectable to one or more peripheral equipment via wireless communication, the first computer comprising:
    an ID reader for reading characteristic identification information held in said wireless peripheral equipment side; and
    connection setting means for setting a wireless data transfer channel between said wireless peripheral equipment by specifying said wireless peripheral equipment based on the identification information read by said ID reader, wherein said connection setting means, in response to an occurrence of a connection request to a second computer while a connection is set to the wireless peripheral equipment sets a new connection to said second computer and releases the connection to the wireless peripheral equipment by sending information from said second computer to said first computer via communication between said first computer and said second computer.

8. The first computer according to claim 7, wherein:
    said ID reader, after setting a connection, reads the identification information from said wireless peripheral equipment by means other than the wireless data transfer channel between said wireless peripheral equipment.

9. The first computer according to claim 7, wherein:
    said ID reader reads characteristic identification information held in the wireless peripheral equipment side by means of the electromagnetic interfacing method.

10. The first computer according to claim 9, wherein:
    in response to wireless peripheral equipment being placed within a communicable range of said ID reader by means of said electromagnetic interfacing method, connection processing with said wireless peripheral equipment commences.

11. The first computer according to claim 7, wherein:
    said wireless peripheral equipment holds visible identification information; and
    said ID reader recognizes a pickup image of said visible identification information and specifies the identification information of said wireless peripheral equipment.

12. The first computer according to claim 7, wherein:
    said ID reader accesses wireless peripheral equipment and reads the identification information by means of infrared data communication or short-range wireless data communication.

* * * * *

UNITED STATES PATENT AND TRADEMARK OFFICE
CERTIFICATE OF CORRECTION

| | |
|---|---|
| PATENT NO. | : 7,228,108 B2 |
| APPLICATION NO. | : 10/332912 |
| DATED | : June 5, 2007 |
| INVENTOR(S) | : Yuji Ayatsuka et al. |

It is certified that error appears in the above-identified patent and that said Letters Patent is hereby corrected as shown below:

In claim 7, column 12, line 26, "equipment sets" should read --equipment, sets--.

Signed and Sealed this

Sixth Day of November, 2007

JON W. DUDAS
*Director of the United States Patent and Trademark Office*